(12) United States Patent
Chang

(10) Patent No.: US 9,285,915 B2
(45) Date of Patent: Mar. 15, 2016

(54) METHOD OF TOUCH COMMAND INTEGRATION AND TOUCH SYSTEM USING THE SAME

(75) Inventor: Yao-Tsung Chang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 877 days.

(21) Appl. No.: 13/492,931

(22) Filed: Jun. 11, 2012

(65) Prior Publication Data

US 2013/0241844 A1 Sep. 19, 2013

(30) Foreign Application Priority Data

Mar. 13, 2012 (TW) ............................. 101108410 A

(51) Int. Cl.
*G06F 3/041* (2006.01)
*G06F 3/0488* (2013.01)

(52) U.S. Cl.
CPC ............ *G06F 3/0416* (2013.01); *G06F 3/0488* (2013.01); *G06F 3/04883* (2013.01)

(58) Field of Classification Search
CPC . G06F 3/0488; G06F 3/04883; G06F 3/0416; G06F 3/1446; G06F 2300/026; G09G 2360/04
USPC ......................................................... 345/173
See application file for complete search history.

(56) References Cited

U.S. PATENT DOCUMENTS 8,947,376 B2 * 2/2015 Sirpal et al. .................... 345/173
2010/0066643 A1 * 3/2010 King et al. ..................... 345/1.3

FOREIGN PATENT DOCUMENTS

CN 102156605 A 8/2011
TW 201033891 9/2010

OTHER PUBLICATIONS

Office action mailed on Jul. 10, 2014 for the Taiwan application No. 101108410, filing date: Mar. 13, 2012, p. 1 line 10-14 and p. 2-11 and p. 12 line 1-11.

* cited by examiner

*Primary Examiner* — Gustavo Polo
(74) *Attorney, Agent, or Firm* — Winston Hsu; Scott Margo

(57) ABSTRACT

A touch command integration method for a touch sense device includes establishing at least one communication connection with at least one first touch sense device, detecting at least one relative location of the at least one first touch sense device relative to the touch sense device, and controlling the at least one first touch sense device via the at least one communication connection according to the at least one relative location, to allow the at least one first touch sense device and the touch sense device to be integrated into a second touch sense device.

18 Claims, 16 Drawing Sheets

METHOD OF TOUCH COMMAND INTEGRATION AND TOUCH SYSTEM USING THE SAME

BACKGROUND OF THE INVENTION

1. Field of the Invention

The present invention relates to a method of touch command integration and touch system, and more particularly, to a method of touch command integration and touch system capable of integrating multiple touch sense devices.

2. Description of the Prior Art

With development of touch technology, in various kinds of consumer electronic products (e.g. a tablet personal computer, a mobile phone, a personal digital assistant (PDA), or an all-in-one device), a touch device has become a main tool for data input. The touch device has the benefits of ease of operation, fast reaction and space efficiency. These features allow a user to perform operations more intuitively and conveniently; consequently, touch control devices have become important input interfaces.

In general, the touch device is disposed on a display panel of an electronic device. The touch device utilizes a detection circuit to detect electrical signals in a matrix composed of a plurality of wires, and convert the electrical signals into digital detection data values to determine a touch command. In such a condition, touch functions of each of the touch devices are independent, the user can only perform independent operation gestures on each of the touch devices so as to execute touch function correspondingly. In other words, if the user intends to combine multiple touch devices into one combined touch sense device for use, the combined touch device may be unable to work or other related problems may occur.

For example, if the user intends to combine the multiple touch devices into the combined touch sense device to display an image or perform the touch command (e.g. commonly display one image on the multiple touch devices or move an object on one of the touch devices of the multiple touch devices to another touch device), the multiple touch devices may not be used jointly due to the touch functions of each of the touch devices are independent, such that the application of the electronic device will be restricted. Thus, there is a need for improvement over the prior art.

SUMMARY OF THE INVENTION

It is therefore an objective of the present invention to provide a method of touch command integration and touch system.

An embodiment of the invention discloses a touch command integration method for a touch sense device. The touch command integration method includes establishing at least one communication connection with at least one first touch sense device; detecting at least one relative location of the at least one first touch sense device relative to the touch sense device; and controlling the at least one first touch sense device via the at least one communication connection according to the at least one relative location, to allow the at least one first touch sense device and the touch sense device to be integrated into a second touch sense device.

An embodiment of the invention further discloses a touch system. The touch system includes a touch sense device and at least one first touch sense device, arranged adjacent to the touch sense device. The touch sense device and the at least one first touch sense device include a memory, respectively, and storing a program code, to indicate the touch sense device and the at least one first touch sense device to execute following steps, the touch sense device establishes at least one communication connection with at least one first touch sense device; the touch sense device detects at least one relative location of the at least one first touch sense device relative to the touch sense device; and the touch sense device controls the at least one first touch sense device via the at least one communication connection according to the at least one relative location, to allow the at least one first touch sense device and the touch sense device to be integrated into a second touch sense device.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
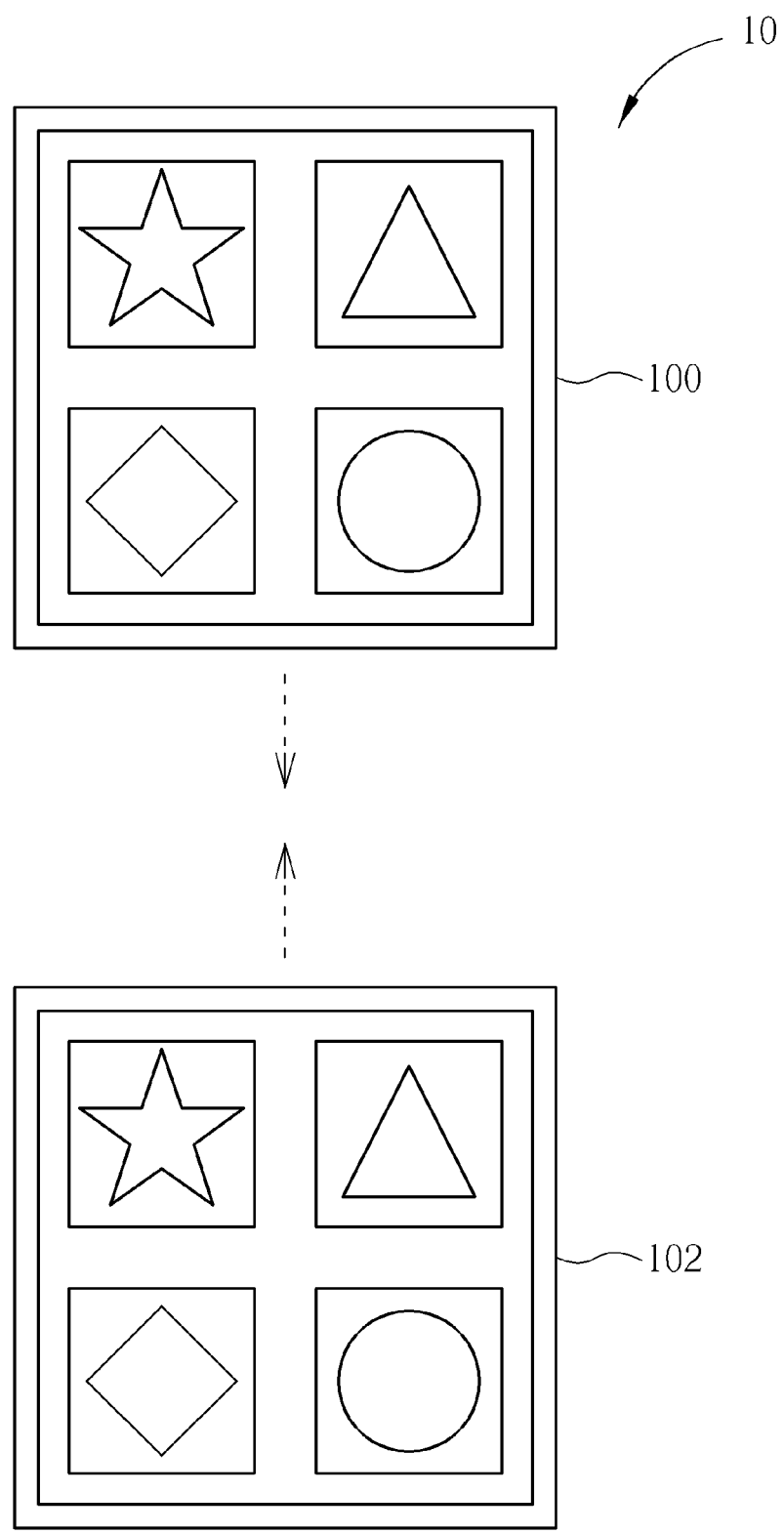
FIG. 1A to FIG. 1C are schematic diagrams of integrated operations of a touch system according to an embodiment of the invention.
Figure 1B:
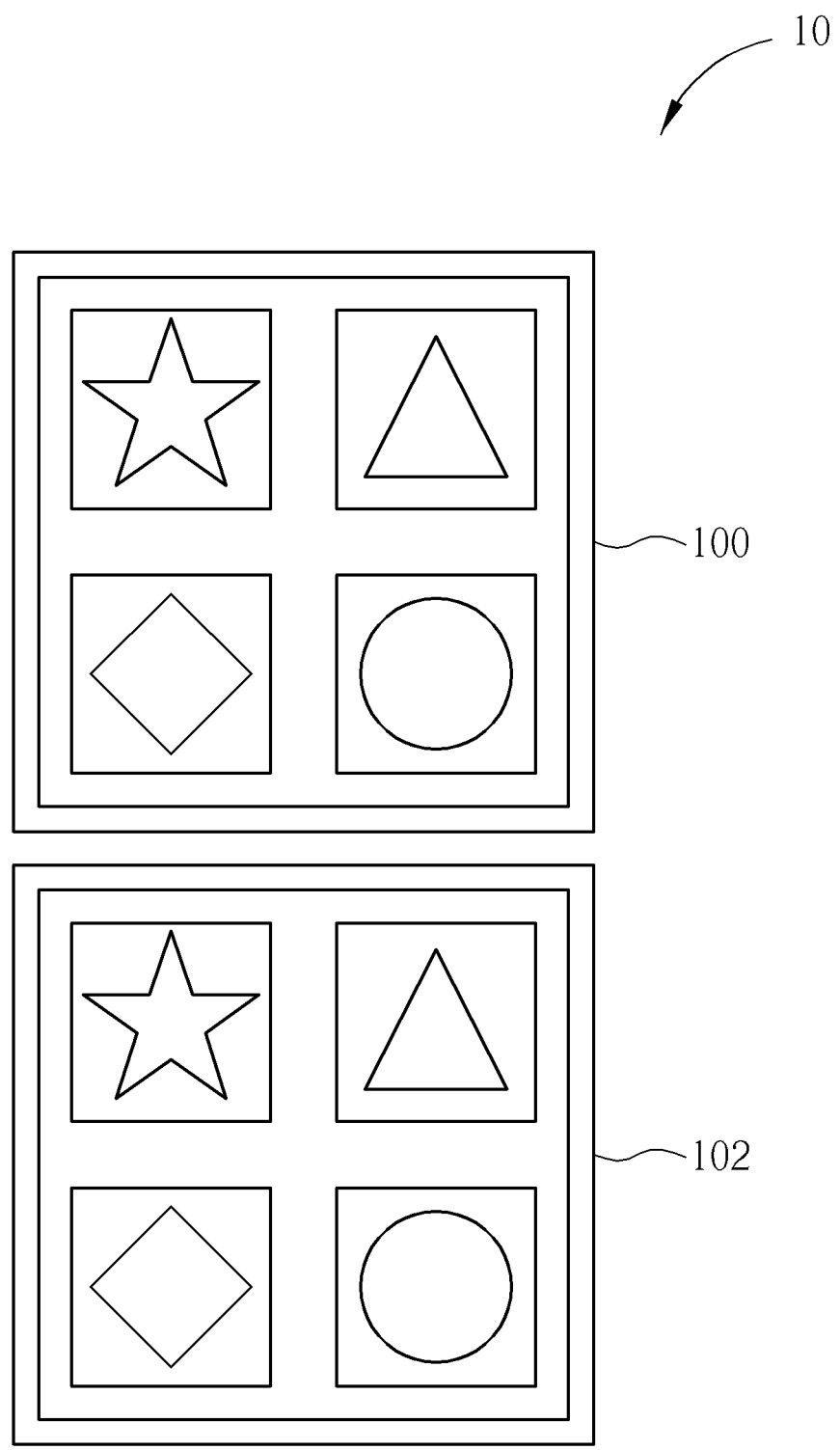
Figure 1C:
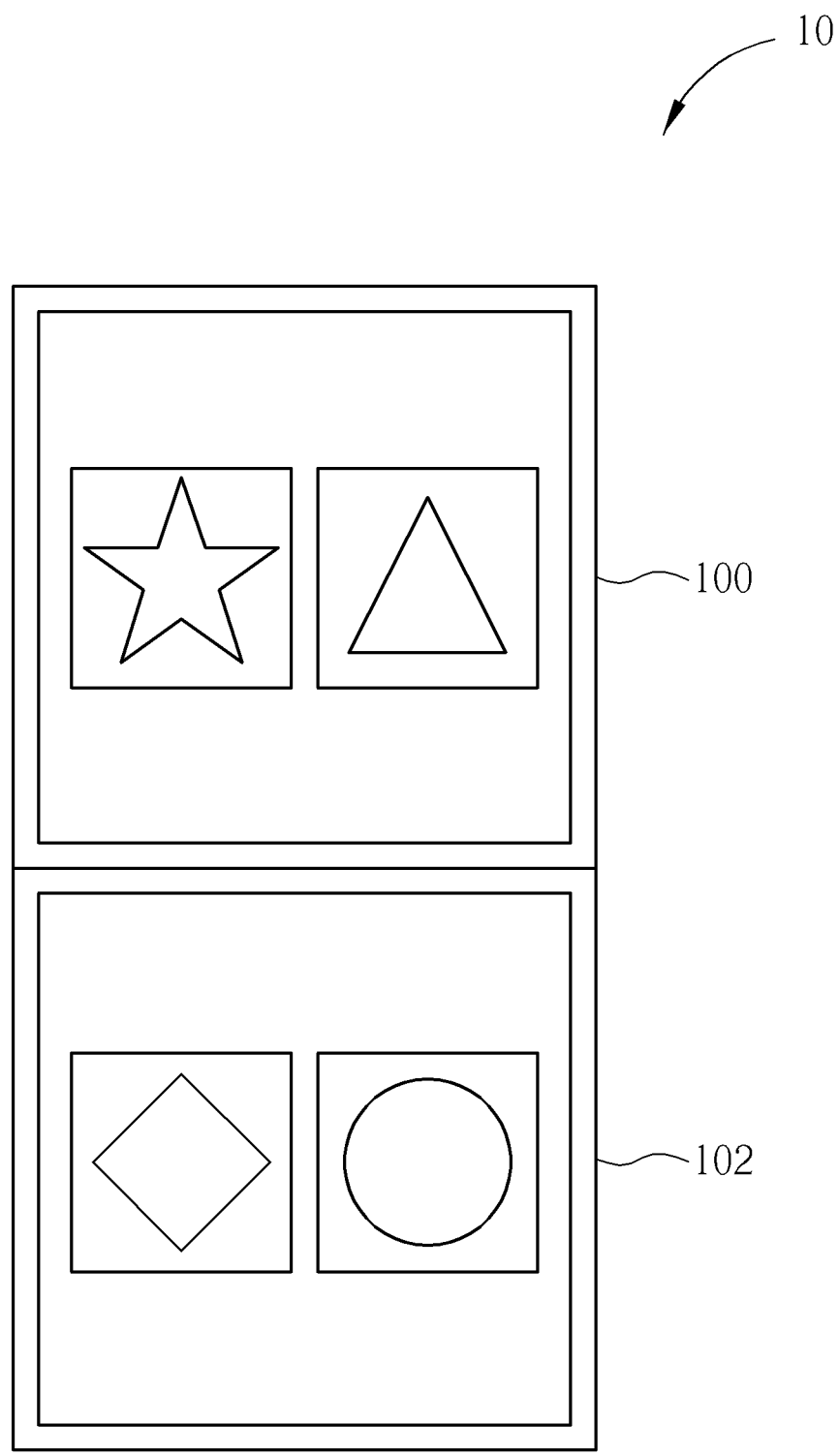

Please refer to FIG. 1A to FIG. 1C, which are schematic diagrams of integrated operations of a touch system 10 according to an embodiment of the invention. As shown in FIG. 1A, the touch system 10 includes touch sense devices 100, 102. The touch sense devices 100, 102 are capable of sensing touch statuses of an object (e.g. a finger, a pen, etc), respectively, and storing a program code utilized for executing integrated functions. In detail, when the touch sense devices 100, 102 move along dotted lines in opposite directions (as shown in FIG. 1A) to locations with a specific distance from each other (as shown in FIG. 1B), a master device of the touch sense devices 100, 102, such as touch sense device 100, can establish a communication connection with the touch sense device 102 by a cable connection, a wireless connection or any other connection method. Wherein, the cable connection can be a universal serial bus (USB) or Ethernet connection, and the wireless connection can be, inter alia, a Bluetooth, WiFi or infrared, etc. After the touch sense device 100 establishes the communication connection with the touch sense device 102, the touch sense device 100 detects a relative location of the touch sense device 102 relative to the touch sense device 100 via a position sensor, such as a G-sensor or global position system (GPS). Then, the touch sense device 100 controls the touch sense device 102 via the communication connection between the touch sense device 100 and the touch sense device 102 according to the relative location of the touch sense device 102, to allow the touch sense device 100 and the touch sense device 102 to be integrated into the touch system 10 with a greater display panel shown in FIG. 1C, to execute related touch integrated functions, such as an image integration or touch command integration, etc.

In short, when the touch sense device 100, 102 are placed at the specific distance from each other, the touch sense device 100, 102 can establish the communication connection with each other by the cable connection, the wireless connection or any other connection method, to allow the touch sense device 100,102 to be integrated into the touch system 10 shown in FIG. 1C, and thereby, a user can perform the related touch integrated functions in the touch system 10.

Note that, FIG. 1A to FIG. 1C are utilized for illustrating the concept of the invention, and those skilled in the art may make alterations or modifications according to the concept of the invention, and is not limited to this. For example, the touch system 10 can establish not only the communication connection with the touch sense device 102 by the touch sense device 100 but also the communication connection with the touch sense device 100 by the touch sense device 102 (i.e. the touch sense device 102 is the master device), depending on system requirements. The specific distance between the touch sense devices 100, 102, such as three millimeters, but is not limited to this as long as the specific distance is enough to allow the touch sense devices 100, 102 to establish the communication connection with each other. The derivative applications are known to those skilled in the art.

Figure 2:
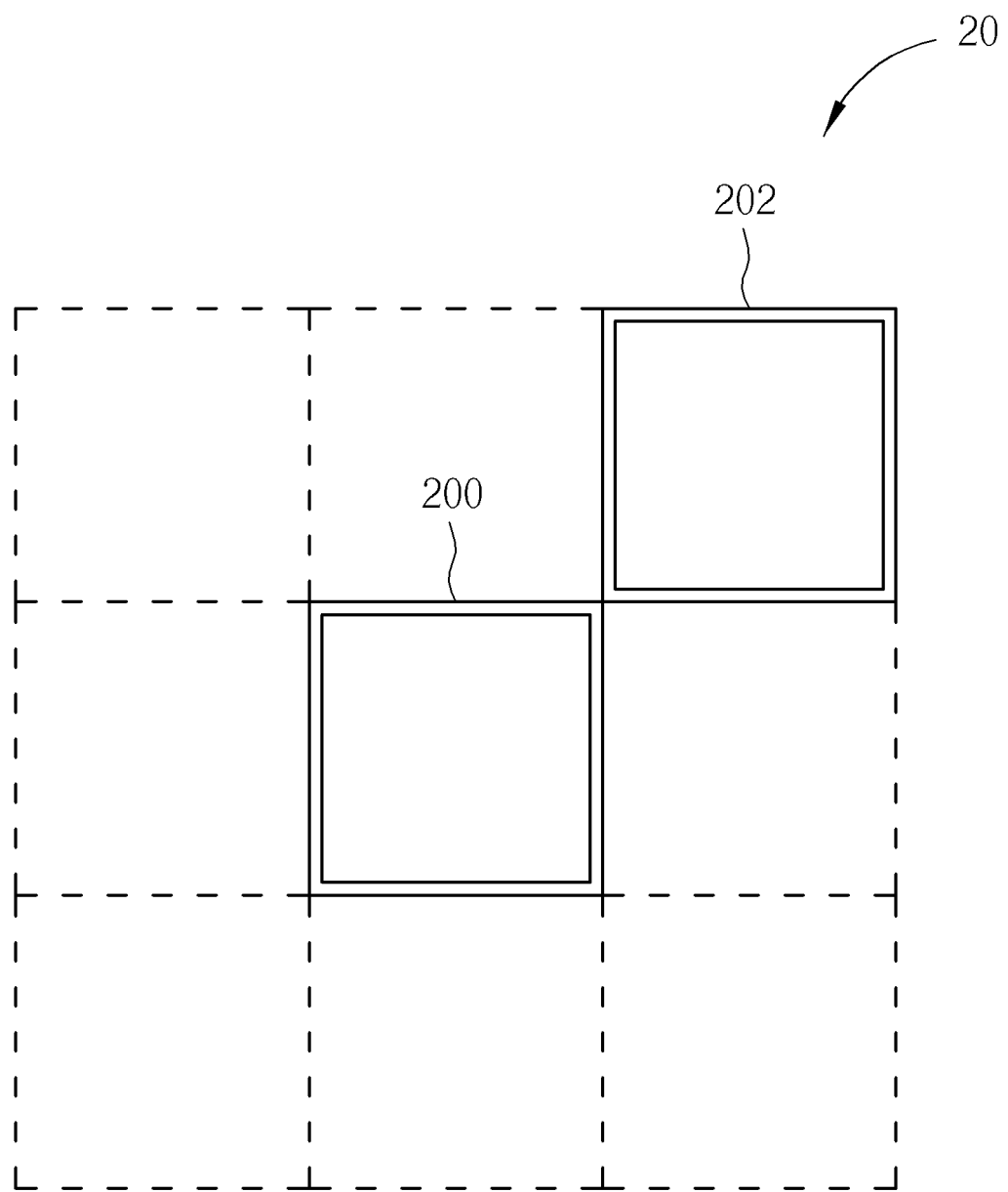
FIG. 2 is a schematic diagram of location setting of a touch system according to an embodiment of the invention.

In addition, in the touch system 10, the touch sense device 100 can detect the relative location of the touch sense device 102 relative to the touch sense device 100 via the position sensor. In practice, the user can also set the relative location of the touch sense devices 100, 102 directly. For example, please refer to FIG. 2, which is a schematic diagram of location setting of a touch system 20 according to an embodiment of the invention. As shown in FIG. 2, the touch system 20 includes touch sense devices 200, 202, and the user can dispose the touch sense device 202 on a peripheral dotted line frame of the touch sense device 200 directly, so as to set the relative location of the touch sense devices 200, 202, which belongs to application of the invention.

Figure 3A:
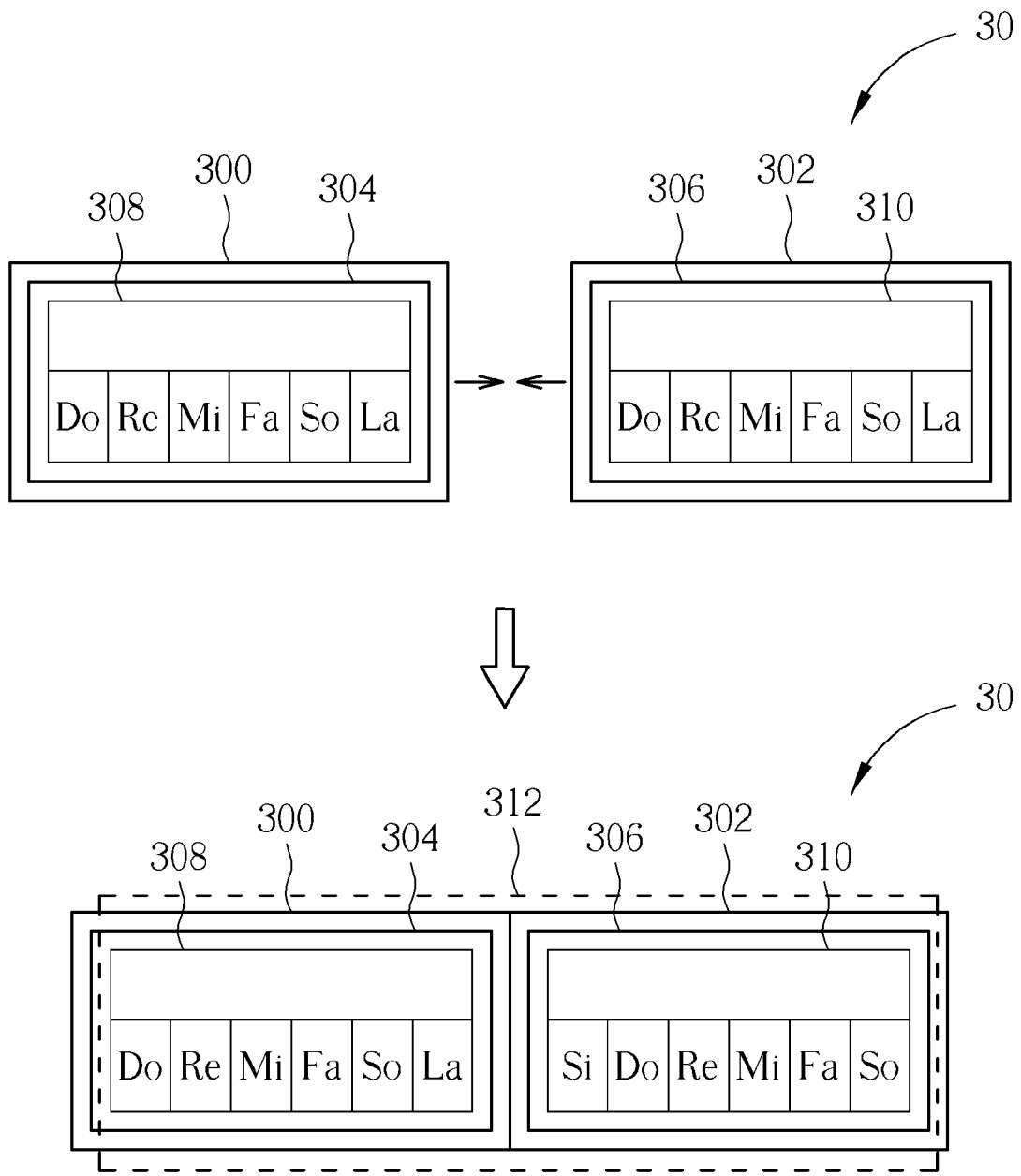
FIG. 3A is a schematic diagram of a touch system according to an embodiment of the invention.

Besides, in FIG. 1A to FIG. 1C, the touch sense devices 100, 102 are arranged in an up and down orientation. In practice, in other embodiments, the touch sense devices 100, 102 can also be arranged in parallel with each other. For example, please refer to FIG. 3A, which is a schematic diagram of a touch system 30 according to an embodiment of the invention. As shown in FIG. 3A, the touch system 30 includes touch sense devices 300, 302, the operations of the touch system 30 is similar to that of the touch system 10, and the touch sense devices 300, 302 can also be integrated into different parts of a single touch sense device. In detail, the touch sense devices 300, 302 include display panels 304, 306, respectively, and the display panels 304, 306 display piano keyboards 308, 310. The piano keyboards 308, 310 are respectively corresponding to six scales (e.g. Do, Re, Mi, Fa, So, La), and the user can allow the touch sense devices 300, 302 to display different touch functions or generate different video effects by touching the piano keyboards 308, 310. Besides, when the touch sense devices 300, 302 are close to each other and a distance between the touch sense devices 300,302 is smaller than a predefined distance, the touch sense devices 300, 302 can establish the communication connection with each other and integrate the piano keyboards 308, 310 to form a piano keyboard 312 with more keys, and the touch system 30 can display twelve scales (e.g. Do, Re, Mi, Fa, So, La, Si, Do, Re, Mi, Fa, So) or issue more corresponding sounds, which is not limited to this.

Figure 3B:
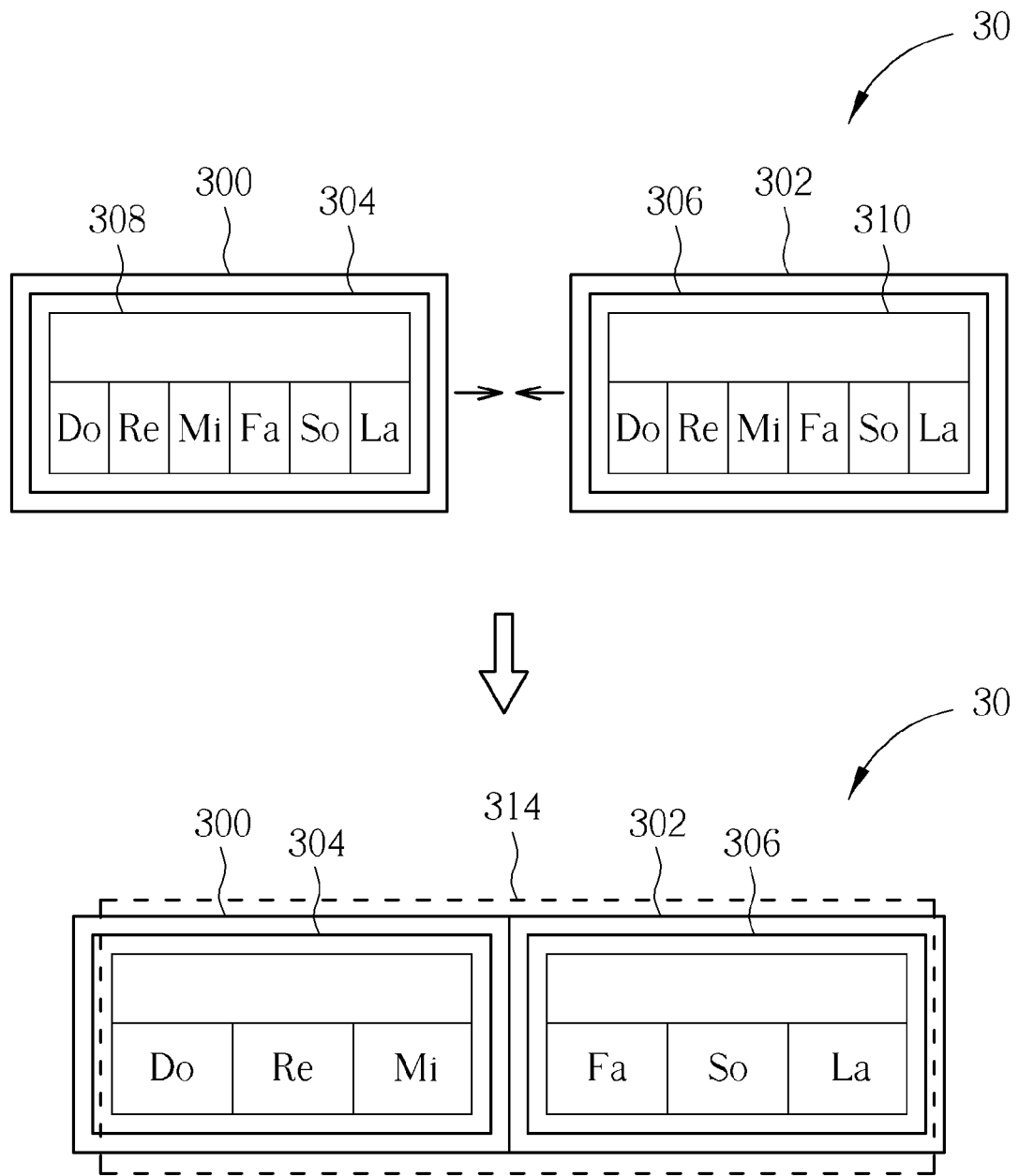
FIG. 3B is a schematic diagram of a different embodiment of the touch system shown in FIG. 3A.

FIG. 3A denoted that when the touch sense devices 300, 302 close to each other, the independent piano keyboards 308, 310 can be integrated into the piano keyboards 312 with more continuous scales. In addition, as shown in FIG. 3B, the piano keyboards 308, 310 can also be integrated into a piano keyboards 314 with larger keys, to facilitate the user to perform the touch function. That is, in FIG. 3B, although the touch system 30 only displays six scales, the keys corresponding to each scale are wider, so as to facilitate the user to perform touch.

Figure 4:
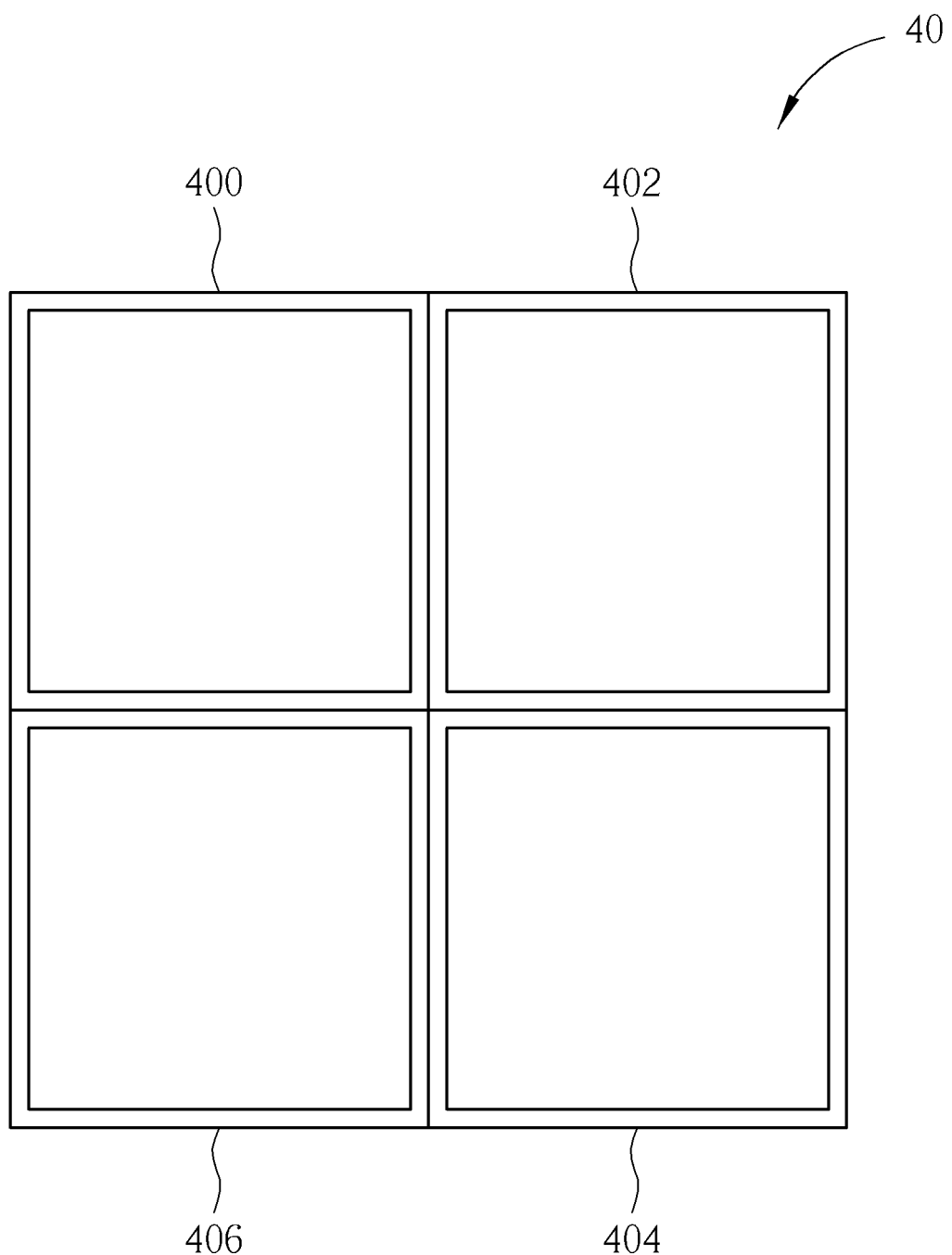
FIG. 4 is a schematic diagram of a touch system according to an embodiment of the invention.

On the other hand, in the above, the touch systems 10, 20, 30 are formed by integrating two touch sense devices, respectively. In practice, in other embodiments, the touch system of the invention can also include multiple touch sense devices. For example, please refer to FIG. 4, which is a schematic diagram of a touch system 40 according to an embodiment of the invention. The touch system 40 is a derivative concept of the touch system 10, and the touch system 40 is composed of touch sense devices 400, 402, 404 and 406, to execute the related touch integrated functions.

Figure 5:
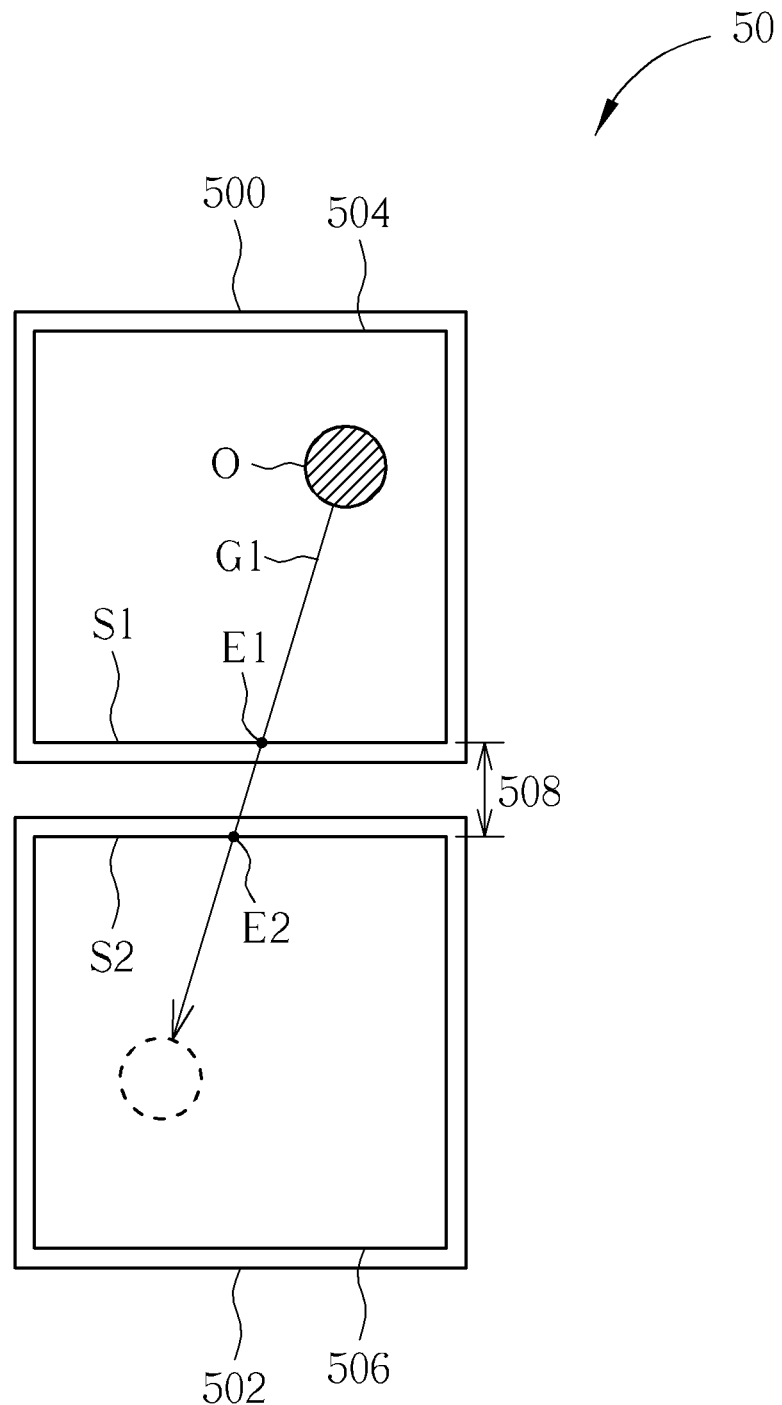
FIG. 5 is a schematic diagram of illustrating a first operation gesture performed on a touch system according to an embodiment of the invention.

Furthermore, in the invention, the touch integrated functions can include an image integration, a touch command integration or other integrated functions. The functions and methods of touch command integration can be referred to the following illustrations. For example, please refer to FIG. 5, which is a schematic diagram illustrating a first operation gesture G1 performed on a touch system 50 according to an embodiment of the invention. In detail, the touch system 50 includes touch sense devices 500, 502, touch areas 504, 506 and a non-touch area 508, the operations of the touch system 50 is similar to that of the touch system 10. First of all, after the touch sense device 500 establishes the communication connection with the touch sense device 502, the user performs the first operation gesture G1 on the touch devices 500, 502, wherein the first operation gesture G1 is performed from the touch area 504 to the touch area 506 across the non-touch area 508. Therefore, the touch sense device 500 receives a first touch signal from the touch sense device 504 within a first time interval, the touch sense devices 500, 502 do not receive any touch signal within a second time interval, and the touch sense device 502 receives a second touch signal from the touch sense device 506 within a third time interval, where the first time interval represents the needed time when the first operation gesture G1 moves over the touch sense device 504, the second time interval represents the needed time when the first operation gesture G1 moves over the non-touch area 508, and the third time interval represents the needed time when the first operation gesture G1 moves over the touch area 506. Then, the touch sense devices 500, 502 determine whether the second time interval is smaller than a first threshold (e.g. 0.5 second). When the second time interval is smaller than the first threshold, the touch sense devices 500, 502 execute a first command corresponding to the first operation gesture G1 according to the first and second touch signals. As shown in FIG. 5, the first command is executed to move an object O from the touch sense device 500 to the touch sense device 502 (as the dotted line show in FIG. 5). On the other hand, if the touch sense devices 500, 502 determine that the second time interval is not smaller than the first threshold, no command is executed.

In short, when the first operation gesture G1 crosses the non-touch area 508, the touch sense devices 500, 502 do not receive any touch signal within the second time interval. Therefore, the touch system 50 and the touch command integration method of the invention determine whether the first operation gesture G1 is a continuous operation gesture based on the second time interval. If the first operation gesture G1 is determined as a continuous operation gesture, the first command corresponding to the first operation gesture G1 is executed according to the touch signals from different touch areas of different touch sense devices correspondingly. On the other hand, if the first operation gesture G1 is determined as a discontinuous operation gesture, no command is executed correspondingly. Therefore, a plurality of touch sense devices of the touch system 50 can be integrated into one larger touch device.

Figure 6:
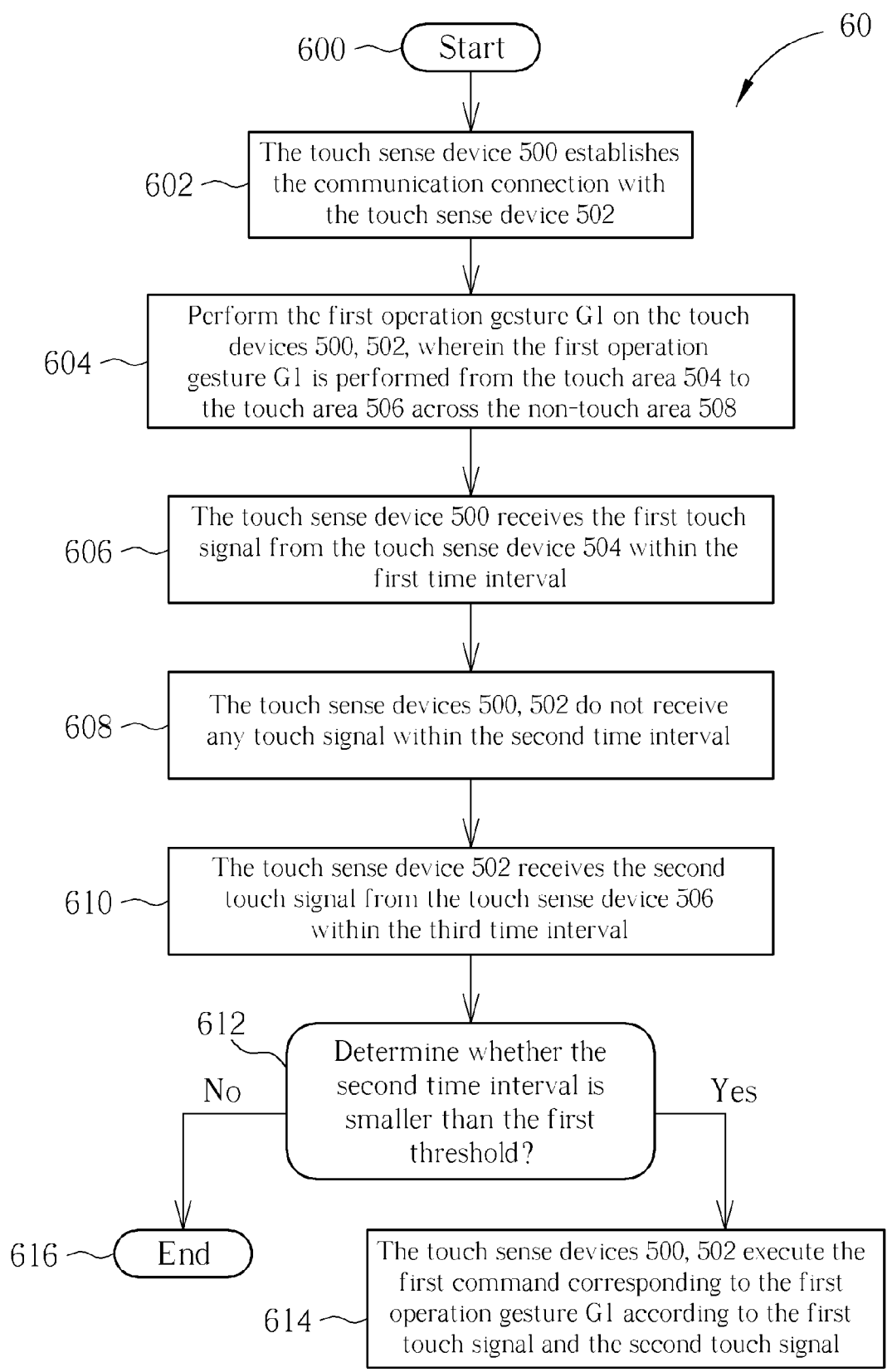
FIG. 6 to FIG. 8 are flowcharts of different touch command integration methods according to an embodiment of the invention.

The above touch command integration method can be summarized into a touch command integration process 60, as shown in FIG. 6. The touch command integration process 60 includes the following steps:

Step 600: Start.

Step 602: The touch sense device 500 establishes the communication connection with the touch sense device 502.

Step 604: Perform the first operation gesture G1 on the touch devices 500, 502, wherein the first operation gesture G1 is performed from the touch area 504 to the touch area 506 across the non-touch area 508.

Step 606: The touch sense device 500 receives the first touch signal from the touch sense device 504 within the first time interval.

Step 608: The touch sense devices 500, 502 do not receive any touch signal within the second time interval.

Step 610: The touch sense device 502 receives the second touch signal from the touch sense device 506 within the third time interval.

Step 612: Determine whether the second time interval is smaller than the first threshold. If yes, go to step 614; otherwise, go to step 616.

Step 614: The touch sense devices 500, 502 execute the first command corresponding to the first operation gesture G1 according to the first touch signal and the second touch signal.

Step 616: End.

The detailed illustrates and related alterations of the touch command integration process 60 can be derived by referring to the above, and are not narrated hereinafter.

Note that, FIG. 5 and FIG. 6 are utilized for illustrating the concept of the invention, and those skilled in the art may make alterations or modifications according to the concept of the invention. For example, the first operation gesture G1 and the corresponding first command can be designed based on practical applications, and are not limited to this.

Figure 7:
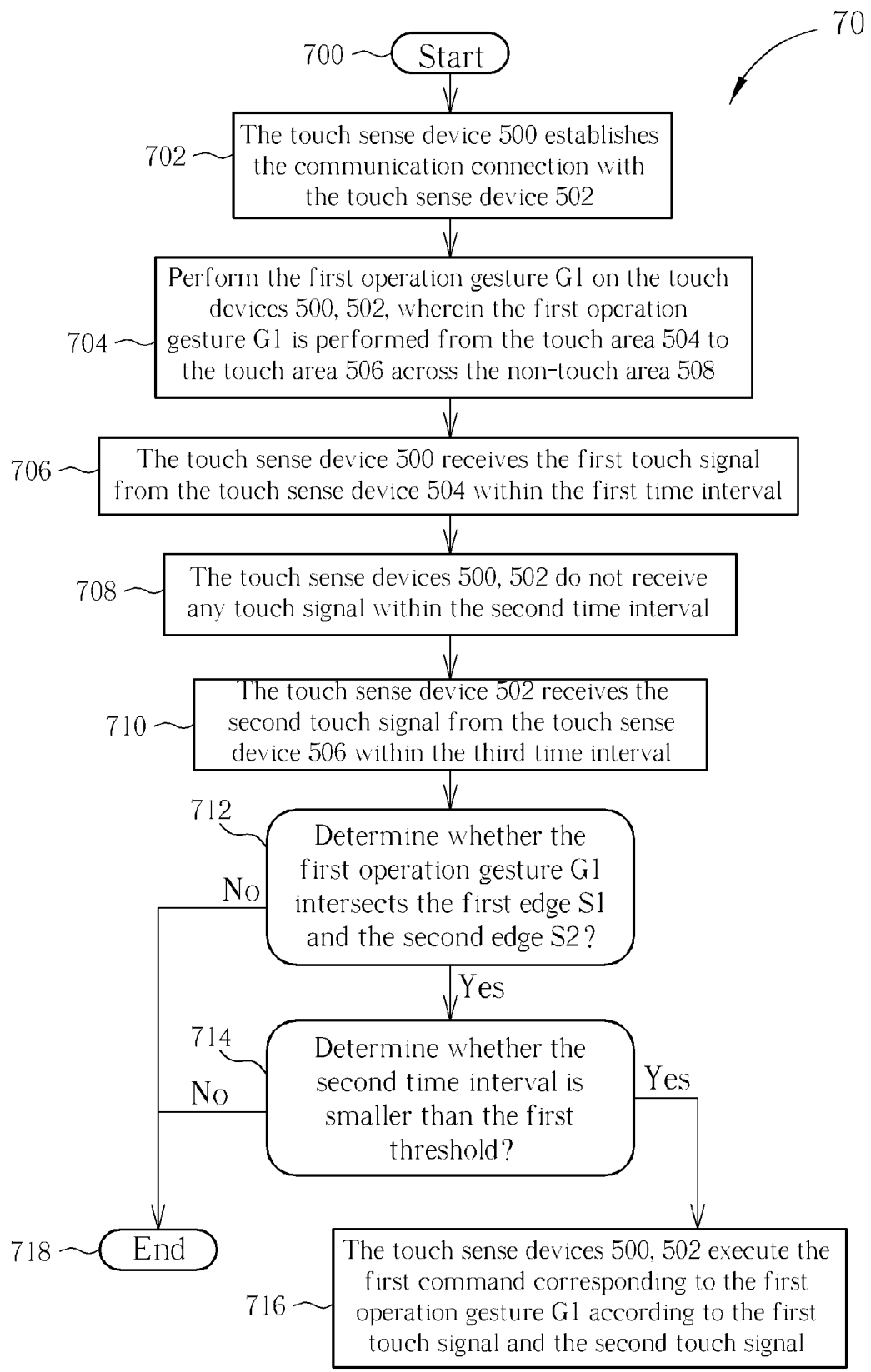

Please refer to FIG. 7, which is a flowchart of a touch command integration method according to another embodiment of the invention. The touch command integration method shown in FIG. 7 may be implemented by program design. The touch system 50 shown in FIG. 5 together with a touch command integration process 70 shown in FIG. 7 will be used to describe the features of this embodiment in the following. As shown in FIG. 5, the non-touch area 508 abuts against a first edge S1 of the touch area 504 and abuts against a second edge S2 of the touch area 506. Steps 700~710 shown in FIG. 7 are substantially the same as steps 600~610 shown in FIG. 6, and are not narrated hereinafter. At step 712, the touch sense device 500 determines whether the first operation gesture G1 intersects the first edge 51, and the touch sense device 502 determines whether the first operation gesture G1 intersects the second edge S2. If the first operation gesture G1 intersects the first edge S1 and the second edge S2, step 714 is then executed. On the other hand, if the first operation gesture G1 does not intersect the first edge S1 or the second edge S2, step 718 is then executed. Steps 714~718 shown in FIG. 7 are substantially the same as steps 612~616 shown in FIG. 6, and are not narrated hereinafter.

In other words, the touch command integration method shown in FIG. 7 determines whether the first operation gesture G1 is a continuous operation gesture based on the second time interval and whether the first operation gesture G1 intersects the first edge S1 and the second edge S2, so as to determine whether to execute the first command.

Figure 8:
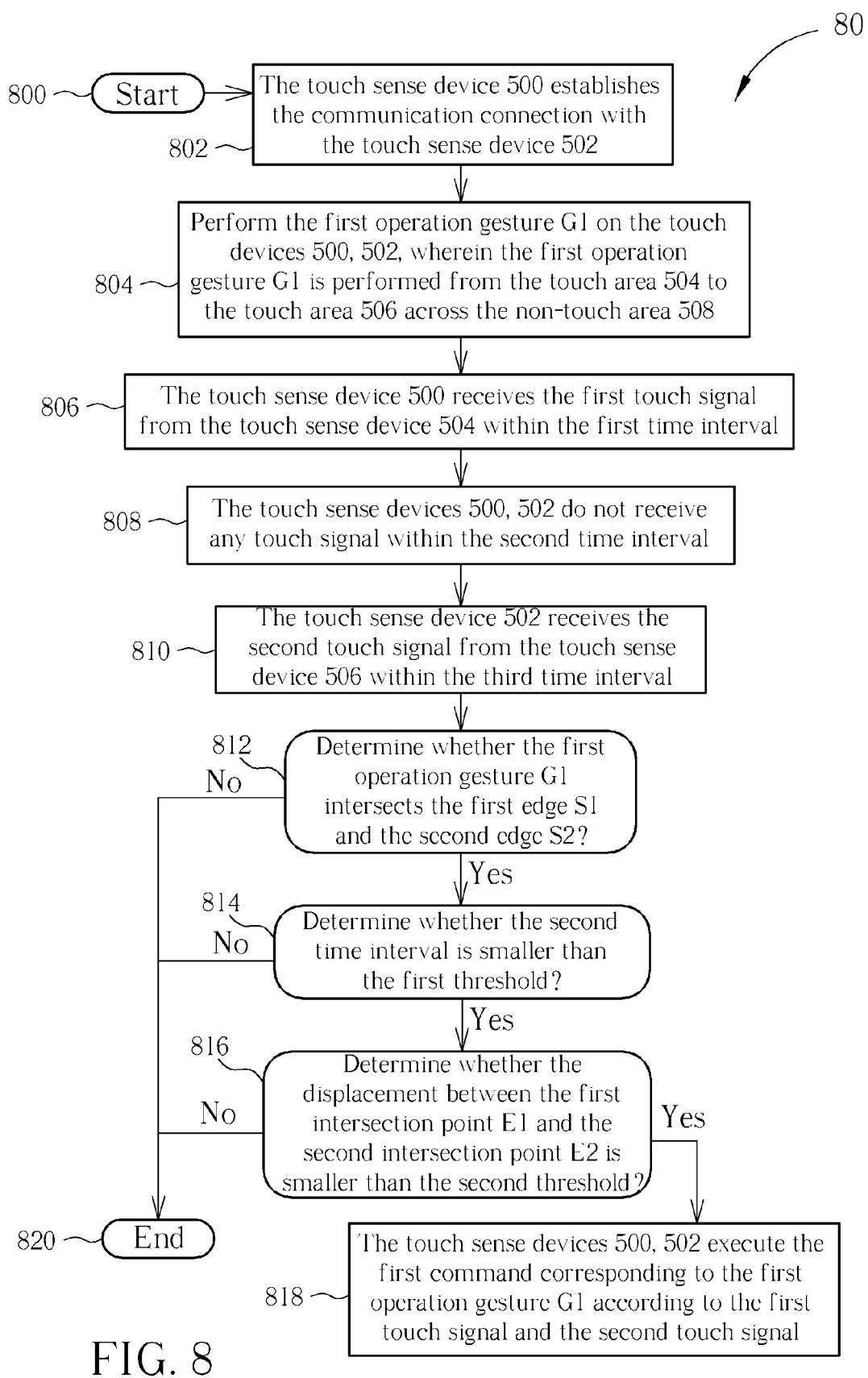

Please refer to FIG. 8, which is a flowchart of a touch command integration method according to another embodiment of the invention. The touch command integration method shown in FIG. 8 may be implemented by program design. The touch system 50 shown in FIG. 5 together with the touch command integration process 80 shown in FIG. 8 will be used to describe the features of this embodiment in the following. As shown in FIG. 5, the first operation gesture G1 intersects the first edge S1 at a first intersection point E1 and intersects the second edge S2 at a second intersection point E2. Steps 800~814 shown in FIG. 8 are substantially the same as steps 700~714 shown in FIG. 7, and are not narrated hereinafter. At step 814, the touch sense devices 500, 502 determine whether a displacement between the first intersection point E1 and the second intersection point E2 is smaller than a second threshold (e.g. 3 mm). If the displacement between the first intersection point E1 and the second intersection point E2 is smaller than the second threshold, step 818 is then executed. On the other hand, if the displacement between the first intersection point E1 and the second intersection point E2 is not smaller than the second threshold, step 802 is then executed. Steps 818~820 shown in FIG. 8 are substantially the same as steps 716~718 shown in FIG. 7, and are not narrated hereinafter.

In other words, the touch command integration method shown in FIG. 8 determines whether the first operation gesture G1 is a continuous operation gesture based on the second time interval, whether the first operation gesture G1 intersects the first edge S1 and the second edge S2, and the displacement between the first intersection point E1 and the second intersection point E2, so as to determine whether to execute the first command.

Note that, when the non-touch area 508 is very small, the first operation gesture G1 across the non-touch area 508 may contact the first edge S1 and the second edge S2 simultaneously. At this time, the aforesaid second time interval may be substantially equal to zero.

Figure 9:
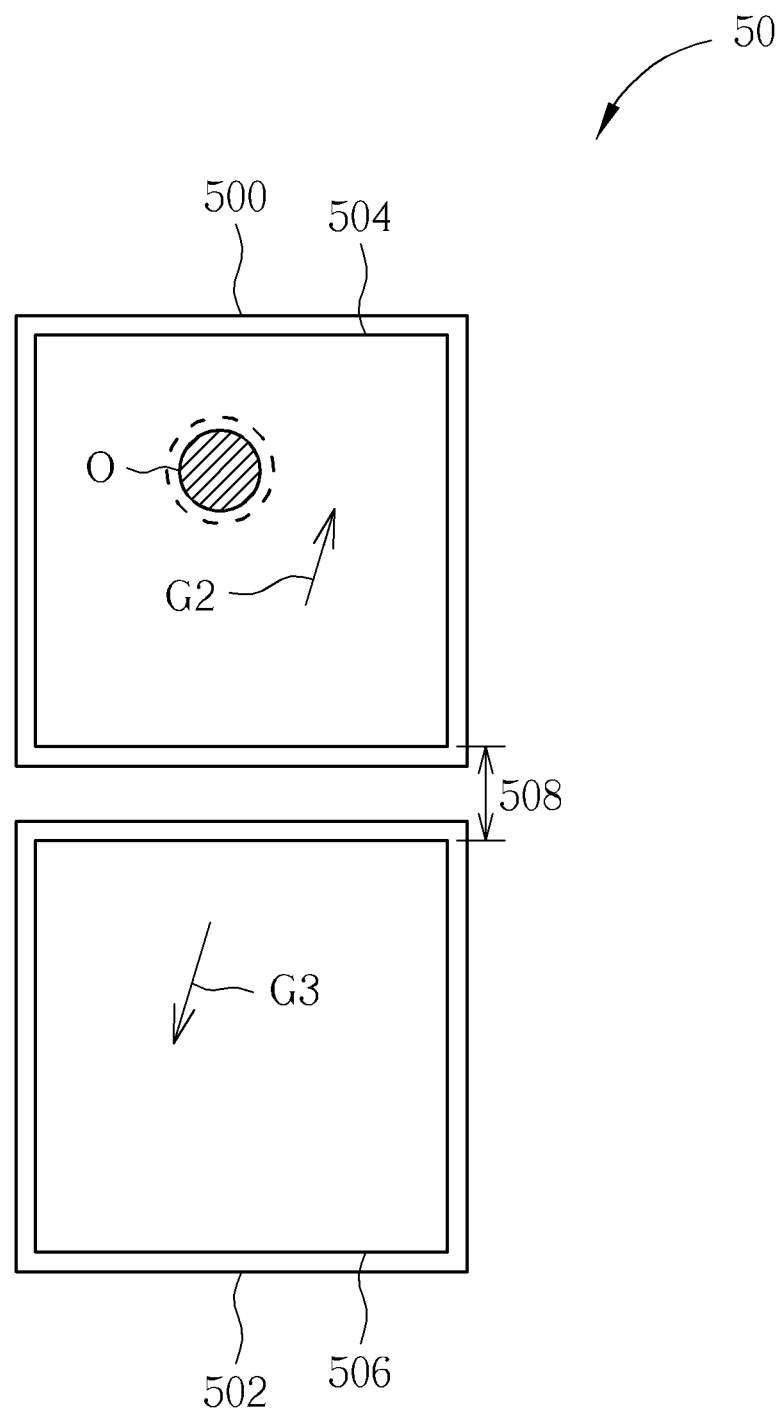
FIG. 9 is a schematic diagram of illustrating a second operation gesture and a third operation gesture performed on a touch system according to an embodiment of the invention.

Please refer to FIG. 9, which is a schematic diagram of illustrating a second operation gesture G2 and a third operation gesture G3 performed on the touch system 50. As shown in FIG. 9, the second operation gesture G2 and the third operation gesture G3 are moving gestures. When the second operation gesture G2 is performed on the touch area 504 and the third operation gesture G3 is performed on the touch area 506, the touch sense devices 500, 502 respectively receive a third touch signal (corresponding to the second operation gesture G2) from the touch area 504 and a fourth touch signal (corresponding to the third operation gesture G3) from the touch area 506 simultaneously, and execute a second command corresponding to the second operation gesture G2 and the third operation gesture G3 according to the third and fourth touch signals. For example, since the second operation gesture G2 and the third operation gesture G3 shown in FIG. 9 move away from each other, the second command is executed to zoom in an object O displayed by the touch sense device 500 (as the dotted line shown in FIG. 9). Similarly, if the second operation gesture G2 and the third operation gesture G3 move close to each other, the second command is executed to zoom out the object O displayed by the touch sense device 500.

Note that, FIG. 9 is utilized for illustrating the concept of the invention, and those skilled in the art may make alterations or modifications according to the concept of the invention. For example, the second operation gesture G2, the third operation gesture G3 and the corresponding second command can be designed based on practical applications, and are not limited to this.

In addition, the touch command integration method of the invention is similar to R.O.C patent application no. 100135969, thus the touch command integration method can refer the R.O.C patent application no. 100135969, and is not narrated hereinafter. Besides, the image integration method of the invention can be derived by referring to the following illustrates.

For example, when the touch system 10 intends to display an image, the touch sense device 100 and the touch sense device 102 establish the communication connection with each other first. Then, the touch sense device 100 detects the relative location of the touch sense device 102, and controls the touch sense device 102 via the communication connection between the touch sense device 100 and the touch sense device 102 according to the relative location, to integrate the touch sense devices 100, 102. Afterward, the touch sense device 100 divides the image intended to be displayed according to an amount of all the touch sense devices, i.e. the amount of all the touch sense devices in the invention is two, thus the touch sense device 100 divides this image into two different images, and then, the touch sense device 100 displays one of the two different images according to the relative location, and transmits another image to the touch sense device 102. Finally, the touch sense device 102 directly displays the image received from the touch sense device 100, so as to achieve the function of image integration on the touch system 10.

Figure 10:
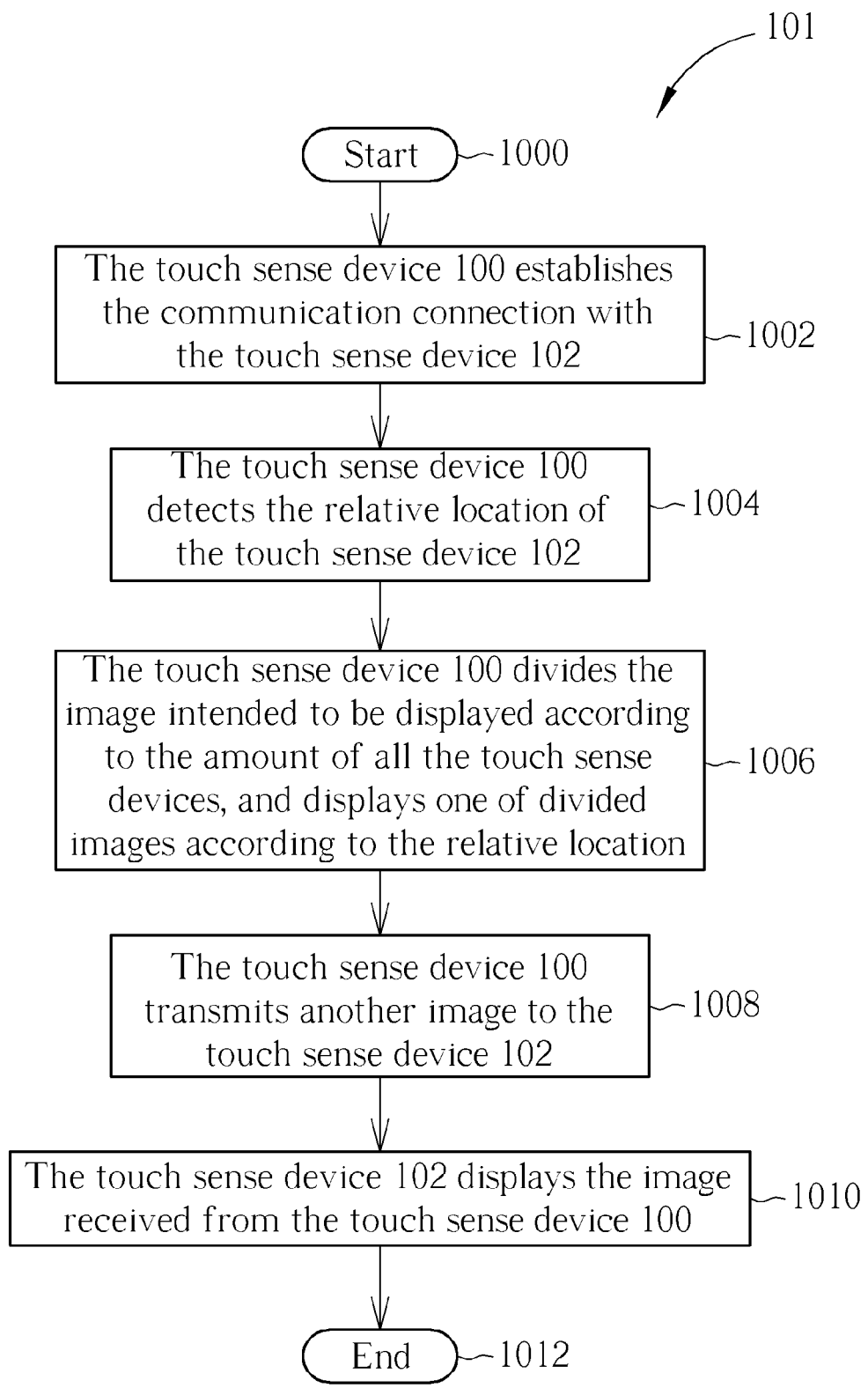
FIG. 10 to FIG. 11 are flowcharts of different image integration methods according to an embodiment of the invention.

The above image integration method can be summarized into an image integration process 101, as shown in FIG. 10. The image integration process 101 includes the following steps:

Step 1000: Start.

Step 1002: The touch sense device 100 establishes the communication connection with the touch sense device 102.

Step 1004: The touch sense device 100 detects the relative location of the touch sense device 102.

Step 1006: The touch sense device 100 divides the image intended to be displayed according to the amount of all the touch sense devices, and displays one of divided images according to the relative location.

Step 1008: The touch sense device 100 transmits another image to the touch sense device 102.

Step 1010: The touch sense device 102 displays the image received from the touch sense device 100.

Step 1012: End.

The detailed illustrates and related alterations of the image integration process 101 can be derived by referring to the above, and are not narrated hereinafter.

Note that, in FIG. 10, when the touch system 10 intends to display the image, the touch system 10 needs to divide the image intended to be displayed, and transmit the divided images to other touch sense devices. In practice, in other embodiments, the image integration of the touch system 10 can also need not to divide the image intended to be displayed. For example, after the touch sense device 100 and the touch sense device 102 establish the communication connection with each other and detect the relative location to integrate into the touch system 10, the touch sense device 100 transmits the image intended to be displayed by the touch system 10 to the touch sense device 102. Then, the touch sense devices 100, 102 display the images required to be displayed according to the relative location, which belongs to application of the invention, and is not limited to this.

Figure 11:
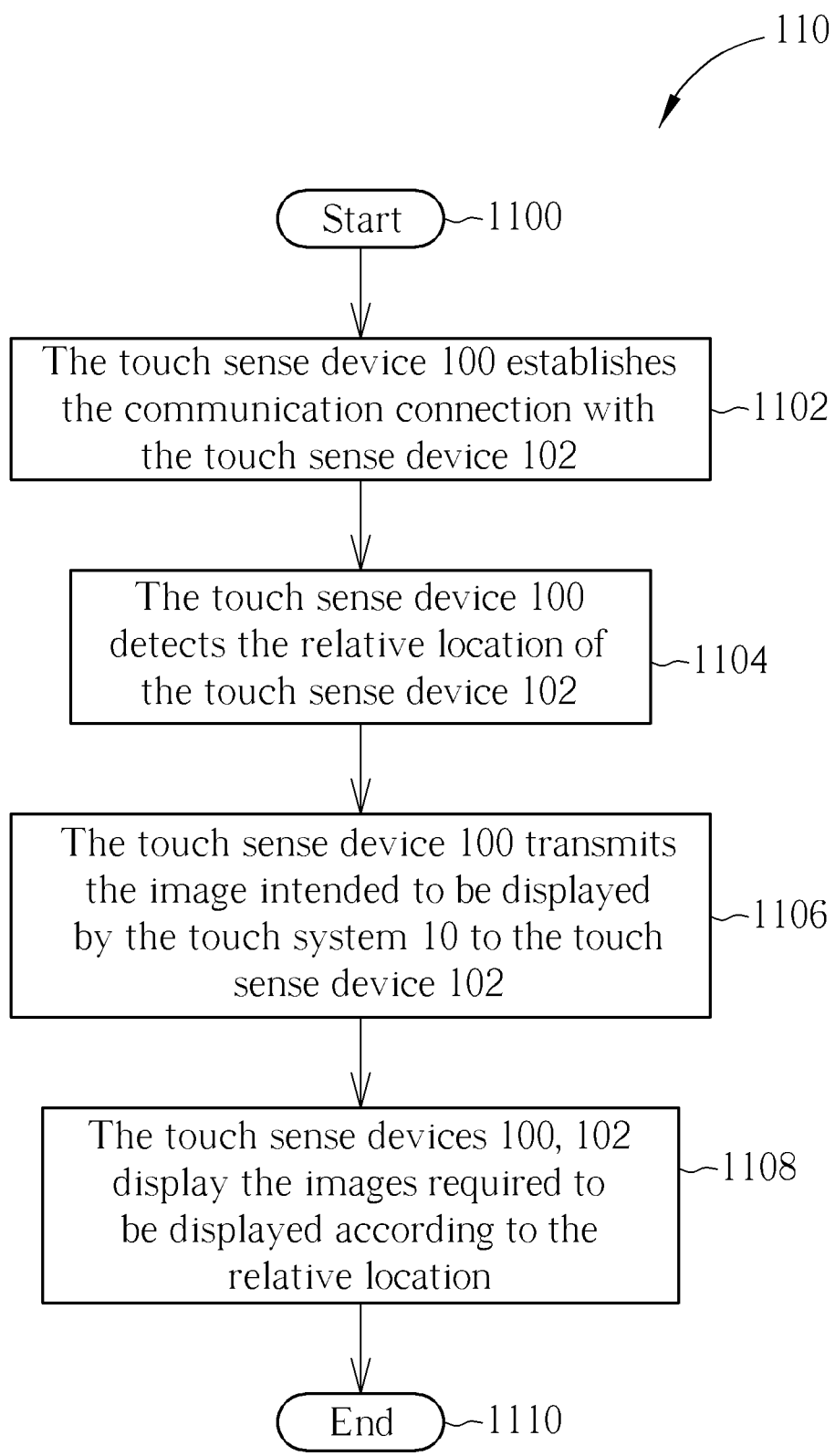

The above image integration method can be summarized into another image integration process 110, as shown in FIG. 11. The image integration process 110 includes the following steps:

Step 1100: Start.

Step 1102: The touch sense device 100 establishes the communication connection with the touch sense device 102.

Step 1104: The touch sense device 100 detects the relative location of the touch sense device 102.

Step 1106: The touch sense device 100 transmits the image intended to be displayed by the touch system 10 to the touch sense device 102.

Step 1108: The touch sense devices 100, 102 display the images required to be displayed according to the relative location.

Step 1110: End.

The detailed illustrates and related alterations of the image integration process 110 can be derived by referring to the above, and are not narrated hereinafter.

Figure 12A:
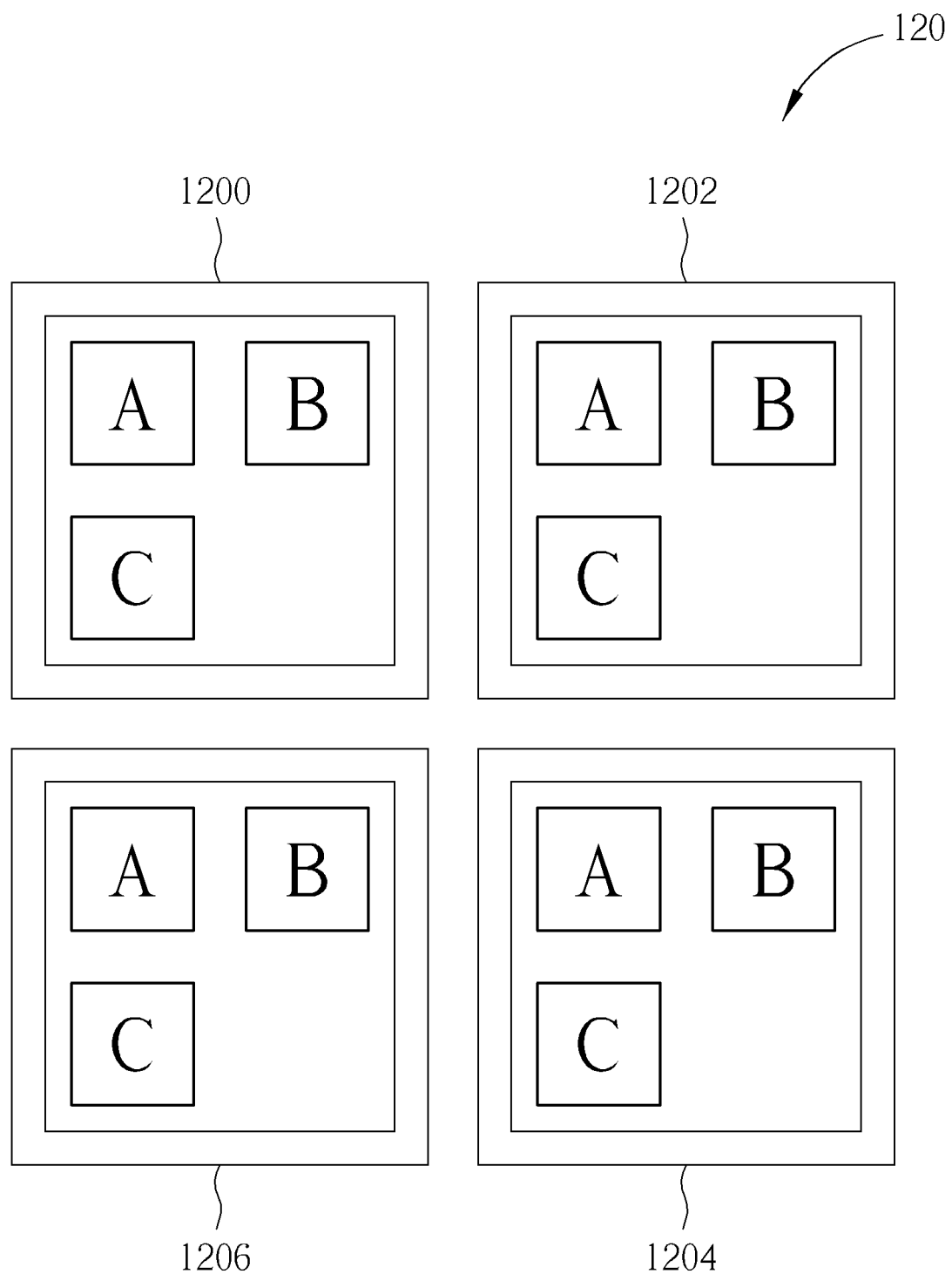
FIG. 12A to FIG. 12B are schematic diagrams of an integrated image according to an embodiment of the invention.
Figure 12B:
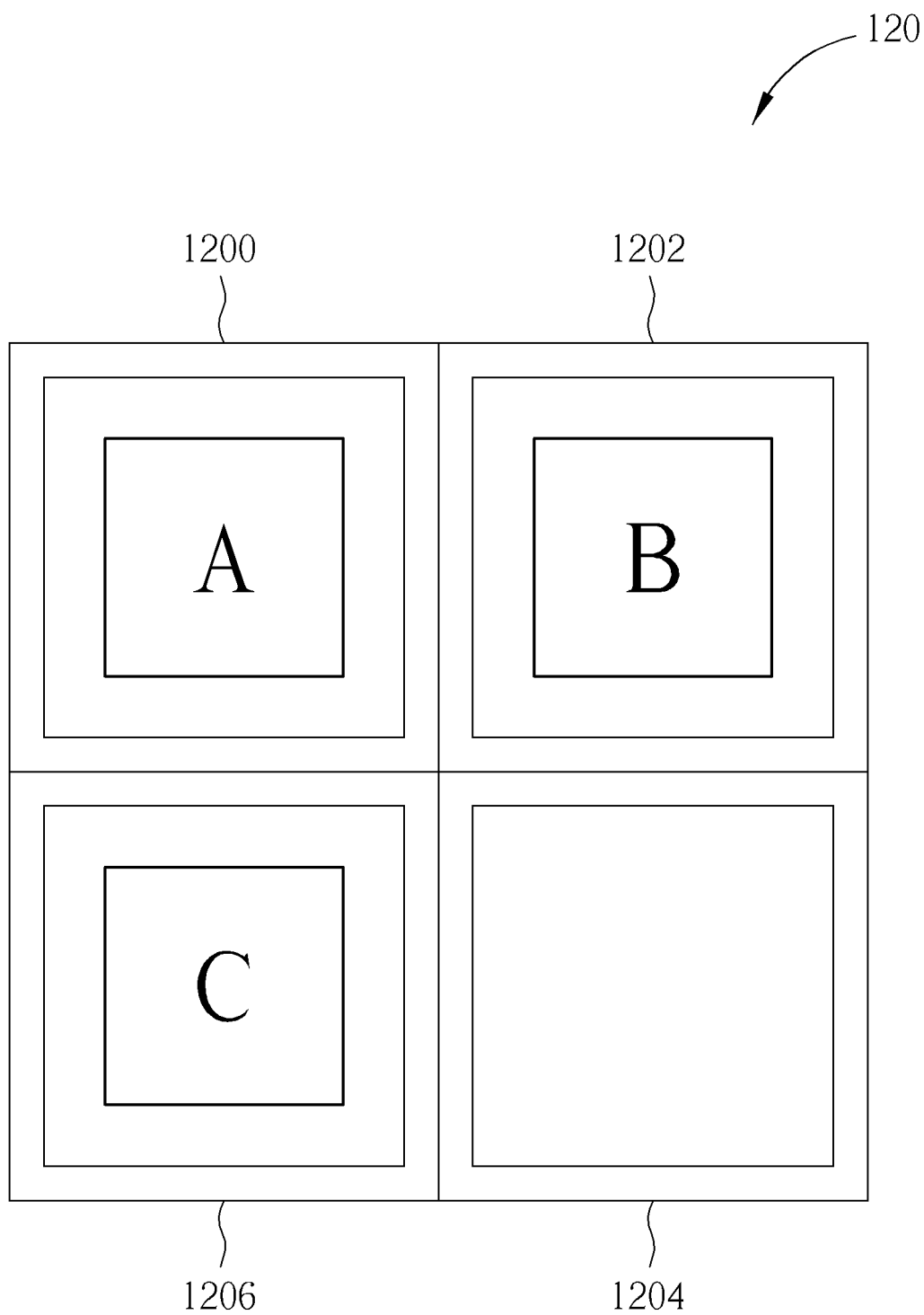

Furthermore, the image integration can be realized on the touch system of the above embodiment via proper image integration processes 101, 110. For example, please refer to FIG. 12A to FIG. 12B, which are schematic diagrams of integrating the image of a touch system 120 according to an embodiment of the invention. As shown in FIG. 12A, the touch system 120 includes touch sense devices 1200, 1202, 1204 and 1206, which display English letters A, B and C, respectively. When the touch system 120 completes the touch sense devices integration and executes the image integration process 101/110, the touch system 120 can display an integrated image, as shown in FIG. 12B, so as to reach the function of the image integration. Those skilled in the art may make alterations or modifications according to the concept of the invention, and is not limited to this.

To sum up, the touch functions of each of the touch sense devices are independent, the user can only perform independent operation gestures on each of the touch sense devices so as to execute the touch function correspondingly, meaning that when the user intends to combine multiple touch sense devices into one combined touch sense device for use, the combined touch sense device may be unable to work or other related problems may occur. In comparison, the invention establishes communication connections with each of the touch sense devices by a cable connection, a wireless connection or any other connection method, so as to integrate the touch sense devices into one larger touch sense device, such that the user can perform related functions of the image integration or touch command integration, etc. on this touch sense device, and thus the application is more flexible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch command integration method for a touch sense device, comprising:

the touch sense device establishing at least one communication connection with at least one first touch sense device, wherein the touch sense device and the at least one first touch sense device are separate devices to process independent touching-displaying operations before the at least one communication connection is established;

detecting at least one relative location of the at least one first touch sense device relative to the touch sense device; and controlling the at least one first touch sense device via the at least one communication connection according to the at least one relative location, to allow the at least one first touch sense device and the touch sense device to be integrated into a second touch sense device;

wherein the second touch sense device is a touch sense device combined by the touch sense device and the at least one first touch sense device, to process an image integration operation or a touch command integration operation after the at least one communication connection is established.

2. The touch command integration method of claim 1, wherein the touch sense device and the at least one first touch sense device having image displaying function, and the step of allowing the at least one first touch sense device and the touch sense device to be integrated into a second touch sense device comprises:

dividing an image into a plurality of sub-images according to an amount of the at least one first touch sense device; and displaying a sub-image of the plurality of sub-images according to the at least one relative location, and transmitting sub-images other than the sub-image of the plurality of sub-images to the at least one first touch sense device, to display the sub-images other than the sub-image by the at least one first touch sense device.

3. The touch command integration method of claim 1, wherein the touch sense device and the at least one first touch sense device has an image displaying function, and the step of allowing the at least one first touch sense device and the touch sense device to be integrated into a second touch sense device comprises:

the touch sense device transmitting an image to the at least one first touch sense device; and the touch sense device and the at least one first touch sense device displaying a plurality of sub-images of the image according to the at least one relative location.

4. The touch command integration method of claim 1, wherein the touch sense device is arranged adjacent to the at least one first touch sense device such that at least one non-touch area is located between the touch sense device and the at least one first touch sense device.

5. The touch command integration method of claim 4, wherein when a first operation gesture is performed from the touch sense device to the at least one first touch sense device across the at least one non-touch area, the touch sense device receives a first touch signal within a first time interval, the touch sense device and the at least one first touch sense device do not receive any touch signal within a second time interval, and the at least one first touch sense device receives at least one second touch signal within a third time interval; when the touch sense device and the at least one first touch sense device determine that the second time interval is smaller than a first threshold, the touch sense device and the at least one first touch sense device execute a first command corresponding to the first operation gesture according to the first touch signal and the at least one second touch signal.

6. The touch command integration method of claim 5, wherein the at least one non-touch area abuts against a first edge of the touch sense device and abuts against at least one second edge of the at least one first touch sense device, when the first operation gesture is performed from the touch sense device to the at least one first touch sense device across the at least one non-touch area, the touch sense device determines whether the first operation gesture intersects the first edge and the at least one first touch sense device determines whether the first operation gesture intersects the at least one second edge; if the first operation gesture intersects the first edge and the at least one second edge and the second time interval is smaller than the first threshold, the touch sense device and the at least one first touch sense device execute the first command corresponding to the first operation gesture according to the first touch signal and the at least one second touch signal.

7. The touch command integration method of claim 6, wherein the first operation gesture intersects the first edge at a first intersection point and intersects the at least one second edge at least one second intersection point, when the touch sense device and the at least one first touch sense device determine that the second time interval is smaller than the first threshold and determine that a displacement between the first intersection point and the at least one second intersection point is smaller than a second threshold, the touch sense device and the at least one first touch sense device execute the first command corresponding to the first operation gesture according to the first touch signal and the at least one second touch signal.

8. The touch command integration method of claim 4, wherein when a second operation gesture is performed on the touch sense device and a third operation gesture is performed on the at least one first touch sense device, the touch sense device receives a third touch signal and the at least one first touch sense device receives at least one fourth touch signal, the touch sense device and the at least one first touch sense device execute a second command corresponding to the second and third operation gestures according to the third touch signal and the at least one fourth touch signal, respectively.

9. The touch command integration method of claim 8, wherein the second and third operation gestures are moving gestures.

10. A touch system, comprising:
a touch sense device; and
at least one first touch sense device, arranged adjacent to the touch sense device;
wherein the touch sense device and the at least one first touch sense device comprise a memory, respectively, and storing a program code, to indicate the touch sense device and the at least one first touch sense device to execute following steps:
  the touch sense device establishes at least one communication connection with at least one first touch sense device, wherein the touch sense device and the at least one first touch sense device are separate devices to process independent touching-displaying operations before the at least one communication connection is established;
  the touch sense device detects at least one relative location of the at least one first touch sense device relative to the touch sense device; and
  the touch sense device controls the at least one first touch sense device via the at least one communication connection according to the at least one relative location, to allow the at least one first touch sense device and the touch sense device to be integrated into a second touch sense device;
  wherein the second touch sense device is a touch sense device combined by the touch sense device and the at least one first touch sense device, to process an image integration operation or a touch command integration operation after the at least one communication connection is established.

11. The touch system of claim 10, wherein the touch sense device and the at least one first touch sense device having image displaying function, and the step of allowing the at least one first touch sense device and the touch sense device to be integrated into a second touch sense device comprises:
dividing an image into a plurality of sub-images according to an amount of the at least one first touch sense device; and
displaying a sub-image of the plurality of sub-images according to the at least one relative location, and transmitting sub-images other than the sub-image of the plurality of sub-images to the at least one first touch sense device, to display the sub-images other than the sub-image by the at least one first touch sense device.

12. The touch system of claim 10, wherein the touch sense device and the at least one first touch sense device has an image displaying function, and the step of allowing the at least one first touch sense device and the touch sense device to be integrated into a second touch sense device comprises:
the touch sense device transmitting an image to the at least one first touch sense device; and
the touch sense device and the at least one first touch sense device displaying a plurality of sub-images of the image according to the at least one relative location.

13. The touch system of claim 10, wherein at least one non-touch area is located between the touch sense device and the at least one first touch sense device.

14. The touch system of claim 13, wherein when a first operation gesture is performed from the touch sense device to the at least one first touch sense device across the at least one non-touch area, the touch sense device receives a first touch signal within a first time interval, the touch sense device and the at least one first touch sense device do not receive any touch signal within a second time interval, and the at least one first touch sense device receives at least one second touch signal within a third time interval; when the touch sense device and the at least one first touch sense device determine that the second time interval is smaller than a first threshold, the touch sense device and the at least one first touch sense device execute a first command corresponding to the first operation gesture according to the first touch signal and the at least one second touch signal.

15. The touch system of claim 14, wherein the at least one non-touch area abuts against a first edge of the touch sense device and abuts against at least one second edge of the at least one first touch sense device, when the first operation gesture is performed from the touch sense device to the at least one first touch sense device across the at least one non-touch area, the touch sense device determines whether the first operation gesture intersects the first edge and the at least one first touch sense device determines whether the first operation gesture intersects the at least one second edge; if the first operation gesture intersects the first edge and the at least one second edge and the second time interval is smaller than the first threshold, the touch sense device and the at least one first touch sense device execute the first command corresponding to the first operation gesture according to the first touch signal and the at least one second touch signal.

16. The touch system of claim 15, wherein the first operation gesture intersects the first edge at a first intersection point and intersects the at least one second edge at least one second intersection point, when the touch sense device and the at least one first touch sense device determine that the second time interval is smaller than the first threshold and determine that a displacement between the first intersection point and the at least one second intersection point is smaller than a second threshold, the touch sense device and the at least one first touch sense device execute the first command corresponding to the first operation gesture according to the first touch signal and the at least one second touch signal.

17. The touch system of claim 13, wherein when a second operation gesture is performed on the touch sense device and a third operation gesture is performed on the at least one first touch sense device, the touch sense device receives a third touch signal and the at least one first touch sense device receives at least one fourth touch signal, the touch sense device and the at least one first touch sense device execute a second command corresponding to the second and third operation gestures according to the third touch signal and the at least one fourth touch signal, respectively.

18. The touch system of claim 17, wherein the second and third operation gestures are moving gestures.

* * * * *